US008903163B2

(12) United States Patent
Sharp et al.

(10) Patent No.: US 8,903,163 B2
(45) Date of Patent: Dec. 2, 2014

(54) USING GRAVITY MEASUREMENTS WITHIN A PHOTOGRAMMETRIC ADJUSTMENT

(75) Inventors: Kevin Sharp, Christchurch (NZ); Shawn Weisenburger, Denver, CO (US)

(73) Assignee: Trimble Navigation Limited, Sunnyvale, CA (US)

( * ) Notice: Subject to any disclaimer, the term of this patent is extended or adjusted under 35 U.S.C. 154(b) by 216 days.

(21) Appl. No.: 13/571,052

(22) Filed: Aug. 9, 2012

(65) Prior Publication Data
US 2014/0044341 A1   Feb. 13, 2014

(51) Int. Cl.
*G06K 9/00* (2006.01)

(52) U.S. Cl.
CPC ........................................ *G06K 9/00* (2013.01)
USPC ........... 382/154; 382/115; 382/133; 382/174; 382/203; 348/157; 348/159; 359/618

(58) Field of Classification Search
CPC ....... G06T 17/00; G06T 7/2033; G06T 15/20; G06T 7/0018; G06T 7/0026; G06T 7/004; G06T 2207/20104; G06T 2207/10028; G06T 7/0022; G06T 7/0042; G06F 3/033; G06K 2209/40; G06K 9/00805; G06K 9/6211; G06K 9/00664; G06K 9/00261; H04N 2201/04791; H04N 7/181; H04N 5/2226; H04N 5/23219; H04N 21/42202; G01C 11/06; G01C 1/00; Y10S 128/916; G01B 11/245; G01B 21/04; A61B 2019/5227; A61B 2019/461; A61B 2019/5289; G01S 19/51
USPC ........... 382/115, 154, 174, 203; 348/157, 159
See application file for complete search history.

(56) References Cited

U.S. PATENT DOCUMENTS

| 4,747,153 | A  | * | 5/1988  | Kouno et al. ................. 382/203 |
| 6,038,074 | A  | * | 3/2000  | Kitaguchi et al. ............ 359/618 |
| 6,417,841 | B1 | * | 7/2002  | Doi et al. ..................... 345/158 |
| 6,650,360 | B1 | * | 11/2003 | Osen ............................. 348/157 |
| 7,292,711 | B2 | * | 11/2007 | Kiraly et al. .................. 382/103 |

(Continued)

FOREIGN PATENT DOCUMENTS

| EP | 1744122 A2 | 1/2007 |
| EP | 2154542 A1 | 2/2010 |
| EP | 2309225 A1 | 4/2011 |

OTHER PUBLICATIONS

Extended European Search Report of EP 13179878, mailed Nov. 29, 2013, 8 pages.

*Primary Examiner* — Vu Le
*Assistant Examiner* — Aklilu Woldemariam
(74) *Attorney, Agent, or Firm* — Kilpatrick Townsend & Stockton LLP (57) ABSTRACT

A method for determining a location of a target includes, at a first location, determining first location coordinates of a measuring device using one or more GNSS signals, determining a first gravitational direction, and capturing a first image using the camera. The method also includes, at a second location, determining second location coordinates of the measuring device, and capturing a second image. The method further includes determining a plurality of correspondence points between the first and second images, determining a first plurality of image coordinates for the plurality of correspondence points in the first image, determining a second plurality of image coordinates for the plurality of correspondence points in the second image, and determining the location of the target using at least the first plurality of image coordinates, the second plurality of image coordinates, and the first gravitational direction.

20 Claims, 8 Drawing Sheets

(56) References Cited

U.S. PATENT DOCUMENTS

| | | | |
|---|---|---|---|
| 7,440,585 B2* | 10/2008 | Roh et al. | 382/103 |
| 7,596,268 B2* | 9/2009 | Kondo et al. | 382/174 |
| 7,720,272 B2* | 5/2010 | Armogida | 382/133 |
| 8,386,179 B2* | 2/2013 | MacDonald | 702/3 |
| 2005/0159231 A1* | 7/2005 | Gobush | 473/131 |
| 2007/0086648 A1* | 4/2007 | Hayashi | 382/154 |
| 2009/0008554 A1* | 1/2009 | Weir et al. | 250/338.1 |
| 2010/0322485 A1* | 12/2010 | Riddiford | 382/115 |
| 2011/0069173 A1* | 3/2011 | Hazzani | 348/159 |
| 2012/0078510 A1* | 3/2012 | Ma et al. | 701/426 |
| 2013/0033581 A1* | 2/2013 | Woo et al. | 348/47 |
| 2014/0156219 A1* | 6/2014 | Soubra et al. | 702/150 |
| 2014/0169627 A1* | 6/2014 | Gupta | 382/103 |

* cited by examiner

USING GRAVITY MEASUREMENTS WITHIN A PHOTOGRAMMETRIC ADJUSTMENT

BACKGROUND

Photogrammetry is the science of making measurements from photographs. Surveying is the technique and science of accurately determining the terrestrial or three-dimensional space position of points and the distances and angles between them. These points are usually, but not exclusively, associated with positions on the surface of the Earth and are often used to establish land maps and boundaries for ownership or governmental purposes. Photogrammetry used in surveying provides an accurate measurement technique for both land-based and aerial surveying.

Stereo photogrammetry makes it possible to determine the three-dimensional coordinates of points on an object, or target. These are determined by measurements made in three or more photographic images taken from different positions. Common points are identified on each image. A line of sight can be constructed from the camera location to the point on the object. It is the intersection of these rays that determines the three-dimensional location of the point.

Despite the advances made in surveying instruments, a need exists in the art for methods and systems for surveying using stereo photogrammetry.

SUMMARY

The present invention relates generally to photogrammetrically determining a location of a target in (or via) a GNSS coordinate system from at least two images. More specifically, the present invention relates to methods and systems for using a gravity measurement to reduce the number of required images from three down to two. Merely by way of example, the invention has been applied to a method of using a handheld device to capture images of a target from at least two locations, along with a gravity measurement for at least one of the locations, in order to determine the location of the target. The methods and techniques can be applied to a variety of surveying and geo-location systems. However, embodiments of the present invention have a broader range of applicability, for example, in the fields of engineering, industrial metrology, archeology, and forensics.

According to an embodiment of the present invention, a method for determining a location of a target in a real-world coordinate system using a measuring device comprising a camera is presented. The real-world coordinate system can include latitude and longitude in GNSS coordinates. The method may include operations at a first location, such as determining first location coordinates of the measuring device using one or more global navigation satellite system (GNSS) signals, determining a first gravitational direction, and capturing a first image using the camera. The relationship between the gravity measurement frame and the camera frame can be calibrated or constrained by manufacturing. The method may also include operations at a second location, such as determining second location coordinates of the measuring device using one or more GNSS signals, and capturing a second image using the camera. The method may additionally include determining a plurality of correspondence points between the first image and the second image. The method may further include determining a first plurality of image coordinates for the plurality of correspondence points in the first image. The method may also include determining a second plurality of image coordinates for the plurality of correspondence points in the second image. The method may additionally include determining the location of the target using at least the first plurality of image coordinates, the second plurality of image coordinates, and the first gravitational direction.

In one embodiment, the location of the target may comprise a GNSS coordinate. In another embodiment, determining the location of the target may further include determining a first camera tilt, comprising a first pitch angle and a first roll angle, and determining a second camera tilt comprising a second pitch angle and a second roll angle. Determining the location of the target may further include providing the first camera tilt, the second camera tilt, the first plurality of image coordinates, the second plurality of image coordinates, the first location coordinates, and the second location coordinates to a bundle adjustment. The first roll angle may be determined by $$\tan^{-1} \frac{-g_y}{\sqrt{g_x^2 + g_z^2}},$$

wherein $g_x$ represents a component of the first gravitational direction in the sensor x direction, $g_y$ represents a component of the first gravitational direction in the sensor y direction, and $g_z$ represents a component of the first gravitational direction in the sensor z direction. Similarly, the first pitch angle may be determined by $$\sin^{-1} \frac{-g_x}{\sqrt{g_x^2 + g_z^2}},$$

wherein $g_x$ represents a component of the first gravitational direction in the sensor x direction and $g_z$ represents a component of the first gravitational direction in the sensor z direction.

The method may also include propagating an error estimate from one or more of the determining steps to determine an error estimate for the location of the target. The method may additionally include determining an orientation of the camera at the first location. In one embodiment, the location of the target may include a location of one of the plurality of correspondence points. In another embodiment, the camera is not accelerating when capturing the first image and the second image. The method may further include determining the plurality of correspondence points using an algorithm configured to identify correspondences in a plurality of images. The method may also include determining a second gravitational direction at the second location, where the plurality of correspondence points includes four or more correspondence points, and determining the location of the target further uses at least the second gravitational direction.

According to another embodiment, a system for determining a location of a target is presented. The system may include a GNSS module configured to receive one or more GNSS signals, a camera, a gravitational measurement device, and one or more processors. The one or more processors may be configured to perform operations at a first location, such as receiving first location coordinates of the GNSS module from the GNSS module, receiving a first gravitational direction from the gravitational measurement device, and receiving a first image from the camera. The one or more processors may be configured to perform operations at a second location, such as receiving second location coordinates of the GNSS module from the GNSS module and receiving a second image from the camera. The one or more processors may also be configured to determine a plurality of correspondence points between the first image and the second image, to determine a first plurality of image coordinates for the plurality of correspondence points in the first image, and to determine a second plurality of image coordinates for the plurality of correspondence points in the second image. The one or more processors may additionally be configured to determine the location of the target using at least the first plurality of image coordinates, the second plurality of image coordinates, and the first gravitational direction.

In one embodiment, the gravitational measurement device comprises a three-axis accelerometer. The system may also include a display screen. In another embodiment, the one or more processors are further configured to receive, using the display screen, a selection of the plurality of correspondence points from a user. The display screen may be configured to display the first image and the second image. The system may further include a hand-held enclosure that at least partially encloses the GNSS module, the gravitation measurement device, and the one or more processors. The one or more processors may be further configured to operate as a bundle adjustment.

Numerous benefits are achieved by way of the present invention over conventional techniques. For example, embodiments of the present invention provide for a faster process of determining an image location by reducing the number of images required. Additionally, embodiments of the present invention can increase the accuracy of a measurement by reducing the number of instances where user error and/or measurement error can affect location calculations. Also, embodiments of the present invention provide a way to determine locations of objects that are secluded from the view of GNSS satellites, such as under a tree. Also, existing photogrammetry bundle adjustment software may be used by some embodiments by converting the gravity measurements to an acceptable format, such as a camera tilt measurement. Depending upon the embodiment, one or more of these benefits may exist. These and other benefits have been described throughout the present specification and more particularly below.

Additional embodiments and features are set forth in part in the description that follows and will become apparent to those skilled in the art upon examination of the specification or may be learned by the practice of the invention. The features and advantages of the invention may be realized and attained by means of the instrumentalities, combinations, and methods described in the specification.

DETAILED DESCRIPTION

Preferred embodiments of the invention are described with reference to the drawings. It is noted that the following description contains examples only and should not be construed as limiting the invention.

Embodiments of the invention generally relate to determining a location of a target and, particularly, to improve the speed of data acquisition by using a gravity measurement taken from at least one of the two imaging locations. Briefly stated, an image of the target and a measurement of the gravity vector affecting the camera can be acquired at one of the two separate locations. The gravity measurements can be used to eliminate the degree of freedom that would otherwise be unresolved by using only two camera images. In some embodiments, a tilt measurement for the camera at each location can be calculated, comprising pitch and roll angles, which can then be provided to a photogrammetric bundle adjustment.

Generally, photogrammetry is the practice of determining the geometric properties of objects from photographic images. In embodiments discussed herein, photogrammetry principles can be used by surveying equipment to determine object locations using a plurality of photographic images. In each process, multiple coordinate systems can be used. This may require translation, rotation, and scale functions to convert coordinates in one coordinate system to another coordinate system. In order to determine a location of a target in real-world coordinates, existing solutions require at least three images of the target and five correspondence points within each image. A correspondence may comprise coordinates in each image that correspond to the same real-world location. For example, if three images include a car, then the image coordinates of the center of the front tire of the car in each image may be considered a correspondence. The specific location of a correspondence may also be referred to herein as a "correspondence point."

Figure 1:
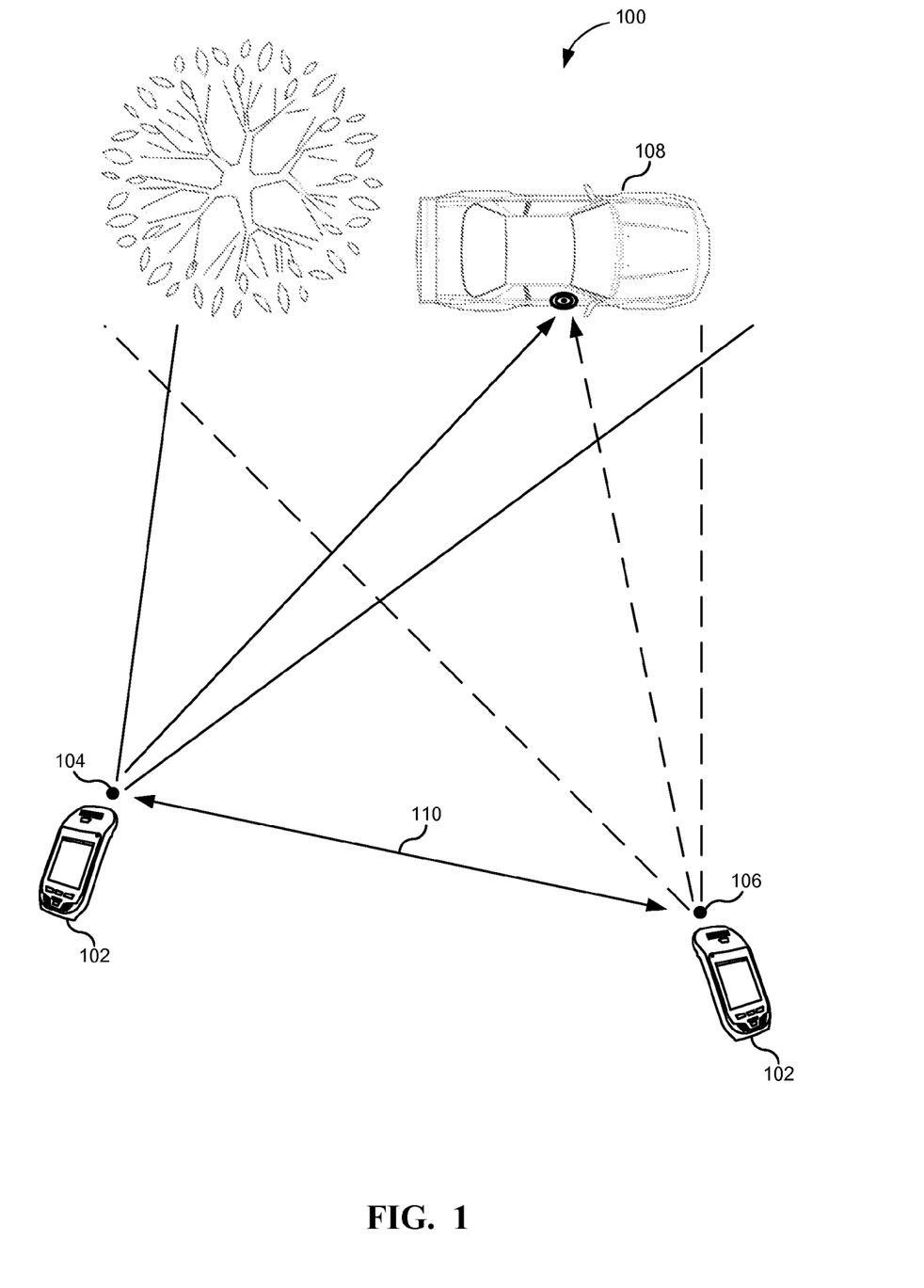
FIG. 1 is a simplified plan view of a measurement site that illustrates an exemplary method of determining a location of a target, according to one embodiment.

FIG. 1 illustrates a simplified plan view 100 of a measurement site that illustrates an exemplary method of determining a location of a target, according to one embodiment. In this embodiment, a measurement device 102 is used to capture and record a plurality of images of a scene containing a target 108. In this example, the target 108 comprises a car. The images are captured from a plurality of different physical locations. In this example, a first image can be captured from a first location 104. Similarly, a second image can be captured from a second location 106.

Note that, in this example, only two image locations are used. Existing solutions require that images of the target 108 be captured from at least three image locations. Capturing images from less than three image locations generally leaves one degree of freedom unresolved, allowing the location of the target 108 to be rotated around at least one axis. Previously, when only two image locations are used, the location of the target 108 can be rotated around the axis defined by a line 110 connecting the first image location 104 to the second image location 106.

However, embodiments of the present invention determine the location of the target 108 using only the first image location 104 and the second image location 106. This may be accomplished by recording a direction of gravitational acceleration at one of the two image locations 104, 106 provided the second image location is horizontally different than the first image location. Depending on how the measurement is used, the direction of gravitational acceleration can eliminate the remaining degree of freedom and fix the location of the target within a real world coordinate system.

In another embodiment, the direction of gravitational acceleration, also referred to as a "gravitational direction," can be used to eliminate one of the required correspondence points in each of the images. Using existing solutions, at least five correspondence points are required to fix the orientation and location of the target 108 in each image. However, if a gravitational direction is recorded at both the first image location 104 and the second image location 106, then one of the five required correspondence points can be eliminated. In other words, only four correspondence points need to be identified if a gravitational direction is measured at both image locations 104, 106.

Figure 2:
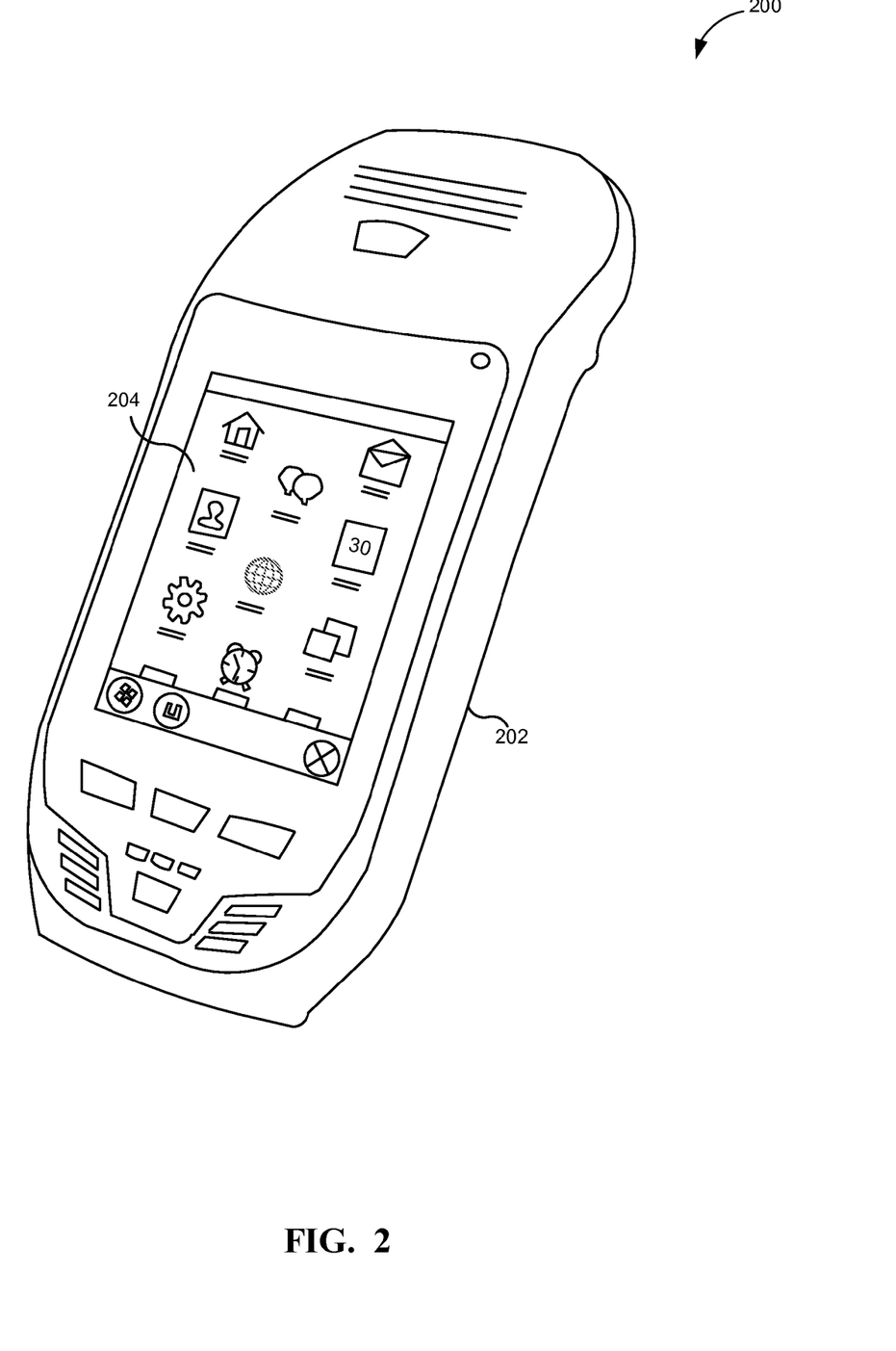
FIG. 2 illustrates a simplified view of an exemplary measurement device that may be used to implement some embodiments.

FIG. 2 illustrates a simplified view of an exemplary measuring device 200 that may be used to implement some embodiments discussed herein. Measuring device 200 can comprise at least a housing 202 and a screen 204. Measuring device 200 may also comprise many other input and output controls such as buttons, speakers, lights, microphones, and/or the like. The housing 202 can be configured to protect and conceal any internal electronic components, such as a processor, a gravitational measurement device, a GNSS module, and/or the like. The screen 204 may be a touchscreen operable using a stylus device, pen, and/or finger gesture to provide inputs to the measuring device 200.

Measuring device 200 can comprise a handheld survey device such as the GeoXH 6000 available from Trimble®. The GeoXH 6000 is a dual frequency handheld GNSS receiver that also includes a built in camera. Using this disclosure, the internal systems of the GeoXH 6000 can be modified by one having skill in the art to further comprise a 3-axis accelerometer on the integrated sensor board, in addition to the existing components. The measuring device 200 in FIG. 2 can represent a GeoXH 6000 that has been internally modified to include a 3-axis accelerometer. Additionally, the GeoXH 6000 includes an instruction memory that can be modified to include instructions that, when executed by the processor, cause the processor to execute the methods described further herein below. For example, a processor in the GeoXH 6000 can execute instructions that cause the modified GeoXH 6000 to determine a target location based on measurements taken at two image locations.

Measuring device 200 can further comprise a camera (not shown). The camera can allow survey measurements to be taken at a distance. This may be particularly useful when targets are located underneath larger objects, are physically difficult to reach, or are otherwise positioned such that accurate GNSS coordinates can be difficult to obtain at the target itself. The photogrammetric positioning techniques can be integrated with GNSS positions that allow for located features to be geo-referenced rather than only relatively located.

A software process for performing the photogrammetric positioning techniques may be referred to as a bundle adjustment, or a photogrammetric adjustment. The bundle adjustment can typically solve for the coordinates of the correspondence points and the "pose" of the camera comprising the camera's position and orientation at each location. It is also possible to solve for the interior orientation of the camera, including the lens distortion, focal length, etc. as part of the bundle adjustment. When using a measuring device 200 such as the GeoXH 6000 having both a high-accuracy GNSS receiver and a camera, the location of the camera can be well known. This information can then be used to determine the scale and orientation of the images captured at each location.

Figure 3:
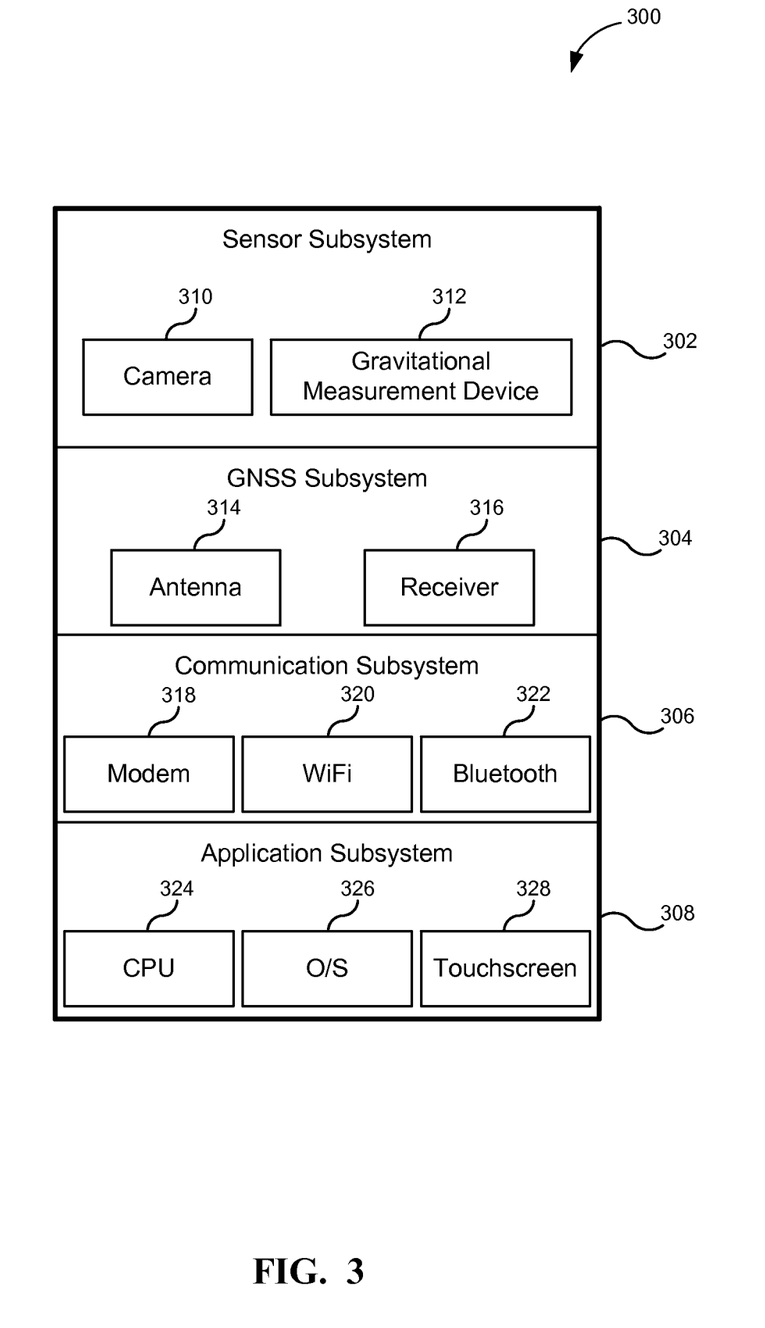
FIG. 3 illustrates a simplified block diagram of elements of an exemplary measurement system that may be used to implement some embodiments.

FIG. 3 illustrates a simplified block diagram of elements of an exemplary measurement system 300 that may be used to implement some embodiments. The measurement system 300 may be implemented using the internal components of a measuring device 200, such as the GeoXH 6000 described above. The measurement system 300 may be implemented on one or more integrated circuit boards that are communicatively coupled to one another. In this embodiment, the measurement system 300 can include a sensor subsystem 302, a GNSS subsystem 304, a communication subsystem 306, and an application subsystem 308. Other systems may also be included that are not shown here for brevity.

The sensor subsystem 302 may include, among other things, a camera 310 and a gravitational measurement device 312. The camera may comprise a charge-coupled device (CCD) camera. In one embodiment, the gravitational measurement device 312 comprises a 3-axis accelerometer that can be used to determine a gravitational direction. The GNSS subsystem 304 may include an antenna 314 and a receiver 316. In one embodiment, the GNSS subsystem 304 may comprise a GPS system.

The communication subsystem 306 may include any number of modules configured to communicate using various communication protocols. In this embodiment, the communication subsystem 306 includes an at least a modem 318, a Wi-Fi communications system 320, and a Bluetooth interface 322. Each part of the communication subsystem 306 may be used to communicate with other computer systems, including a central processing system configured to store and process measurements and images from one or more measuring devices 200. The communication subsystem 306 may also be configured to communicate directly with another measuring device 200.

The application subsystem 308 may comprise a CPU 324, an operating system 326, and a touchscreen 328, along with other hardware and/or software components. The operating system 326 may be stored on an instruction memory that can be read by the CPU 324. Various applications may be loaded onto the instruction memory or, alternatively, onto a second memory that can also be read by the CPU 324. Various applications may include software routines that instruct the processor to determine a target location using measurements associated with two images and one or more measurements of a gravitational direction. The touchscreen 328 may be configured as both an input and an output device. In one embodiment, the touchscreen 328 can be configured to display a first image and a second image to a user, the first image being received at a first location, and the second image being received at a second location. The touchscreen 328 can be configured to receive a selection of a plurality of correspondence points from a user. In other words, a user can select image coordinates of the correspondence points in a first image using a stylus, pen, or finger gesture. Then, in the second image, the touchscreen 328 can be configured to receive image coordinates for the plurality of correspondence points in the second image. The touchscreen 328 may also be configured to display the correspondence points in each image. The correspondence points may be represented using an icon, such as a dot, a target, an arrow, and/or the like.

In one embodiment, the application subsystem 308 may be remotely located from the measurement system 300. For example, the application subsystem 308 can be located at a central processing system. In this embodiment, the measurement system 300 can be used to obtain photographs of a target, position coordinates, and one or more gravity measurements. Then, the measurement system 300 can provide these data to a central processing system, which can in turn identify correspondence points and run a bundle adjustment software routine. The central processing system can receive data from multiple measurement systems, and can be used to centrally store and process surveying information from the multiple measurement systems. The multiple measurement systems can transmit measurement data to the central processing system through both wired and wireless connections.

The various subsystems shown in the measurement system 300 of FIG. 3 can be implemented using any combination of hardware and software, including commercially available microcontrollers, microprocessors, FPGAs, or specifically designed ASICs. The operating system can include a mobile operating system supplied by Microsoft®, and the various memories may include RAM, DRAM, SRAM, flash memory, and/or the like. Furthermore, each of the modules shown in the measuring system 300 may be further combined or subdivided in ways that are not shown explicitly in FIG. 3. For example, the GNSS antenna 314 and the GNSS receiver 316 may be combined into one hardware module that can be integrated with the rest of the measurement system 300. Similarly, the CPU 324 may be implanted using multi-core processing systems or multiple independently operating processors.

Figure 4:
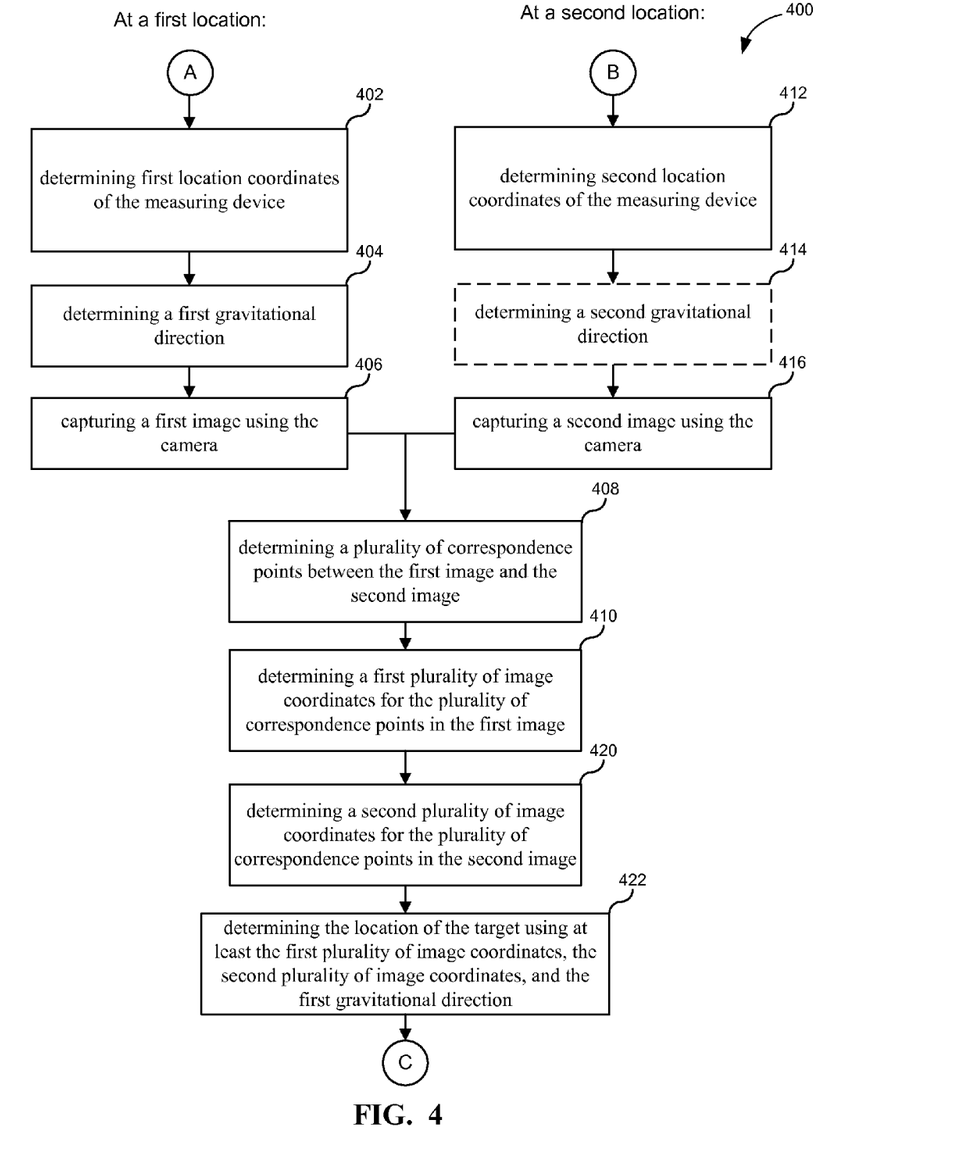
FIG. 4 illustrates a simplified flowchart of a method for determining a location of a target using a measuring device comprising a camera, according to one embodiment.

FIG. 4 illustrates a simplified flowchart 400 of a method for determining a location of a target using a measuring device comprising a camera, according to one embodiment. The method may include actions that are taken at a first physical location and actions that are taken at a second physical location. At a first physical location, the method may include determining first location coordinates of the measuring device (402). Similarly, at a second location, the method may include determining second location coordinates of the measuring device (412).

This disclosure may describe two distinct physical locations as a "first" location and a "second" location. The terms "first" and "second" are used merely to distinguish the two locations from each other, and do not necessarily imply an order. Therefore, operations may be carried out at the second location before operations are carried out at the first location. Furthermore, the various operations carried out at each location may be referred to using the same labels. For example, a gravitational direction determined that the first location may be referred to as a "first gravitational direction" without necessarily implying that the first gravitational direction was determined prior to, or subsequent to, any other operation.

In one embodiment, the first location coordinates of the measuring device and/or the second location coordinates of the measuring device may be determined using one or more GNSS signals. In another embodiment, the first location coordinates and/or the second location coordinates may be determined by referencing a known location. In yet another embodiment, the first location coordinates and/or the second location coordinates may be determined using a device such as a "total station" available from Trimble Navigation®. Some embodiments may use one of these methods for determining the first location coordinates, and may then use another of these methods for determining the second location coordinates.

In embodiments using GNSS signals, the one or more GNSS signals may be received from a GNSS subsystem that is approximately co-located with the camera, such that the one or more GNSS signals may be considered to locate the focal point of the camera. In another embodiment, the GNSS signals may be received at a known distance from the focal point of the camera, and the known distance may be used to adjust the first location and the second location to pinpoint the focal point of the camera. In many handheld systems, such as the GeoXH 6000, the GNSS subsystem and the camera may be substantially co-located such that the GNSS signals may be considered to locate the focal point of the camera.

Figure 5A:
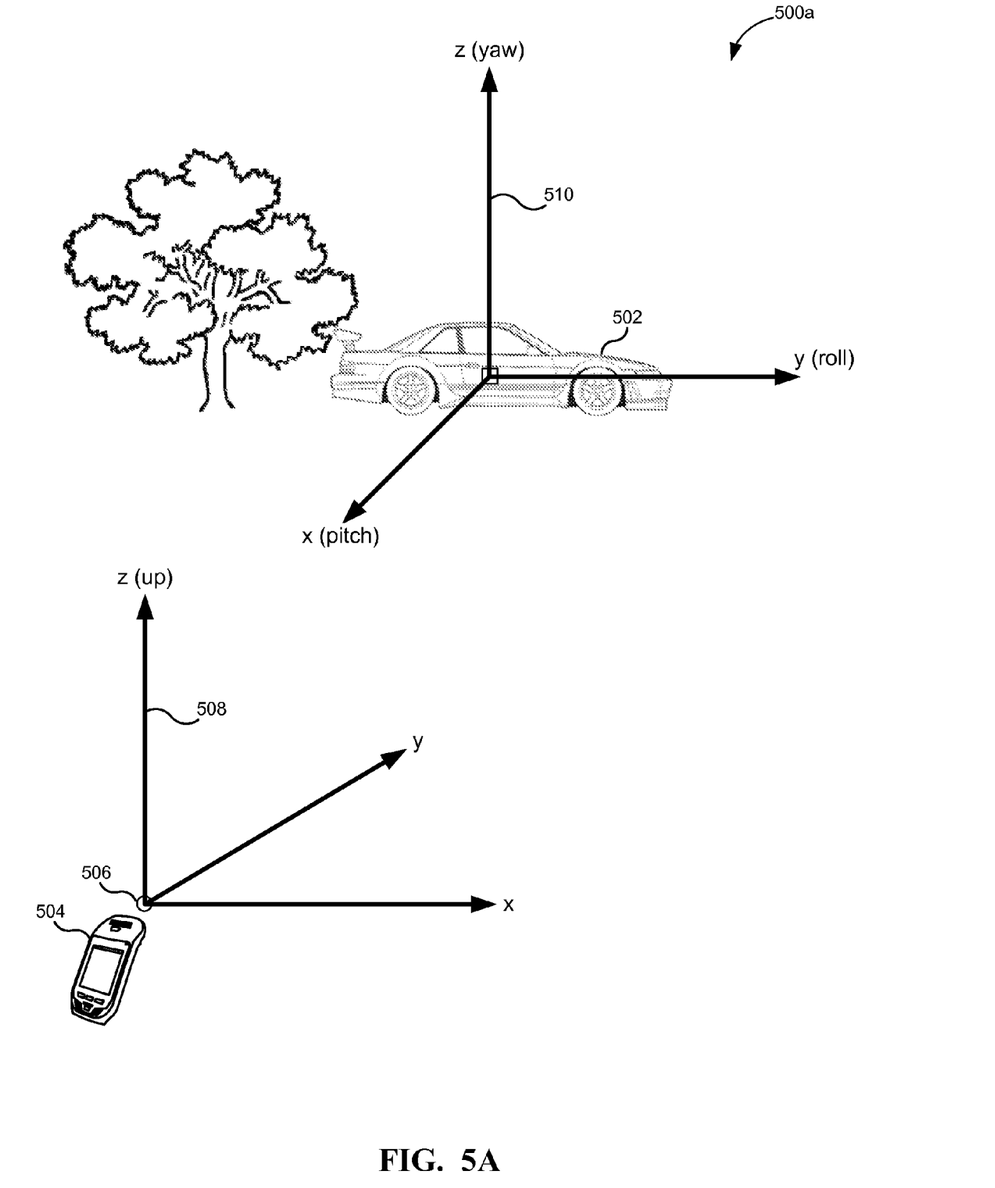
FIGS. 5A-5B illustrate simplified perspective views of first and second measurement sites used in an exemplary method of determining a location of a target, according to one embodiment.

To further illustrate, FIG. 5A shows a simplified perspective view of a first measurement site 500a used in an exemplary method of determining a location of a target 502, according to one embodiment. In this example, the target 502 comprises a car. The measuring device 504 is located at a first location 506. The GNSS subsystem of the measuring device 504 can determine first location coordinates of the measuring device 504 at the first location 506. Note that a number of coordinate systems may be involved in this first measurement. First, a real world coordinate system may be used by the one or more GNSS signals. Second, a local coordinate system 508 for the measuring device 504 may be used for local measurements. Additionally, a target coordinate system 510 may be used for the target 502. Methods for translating measurements between these various coordinate systems will be discussed further herein below.

Figure 5B:
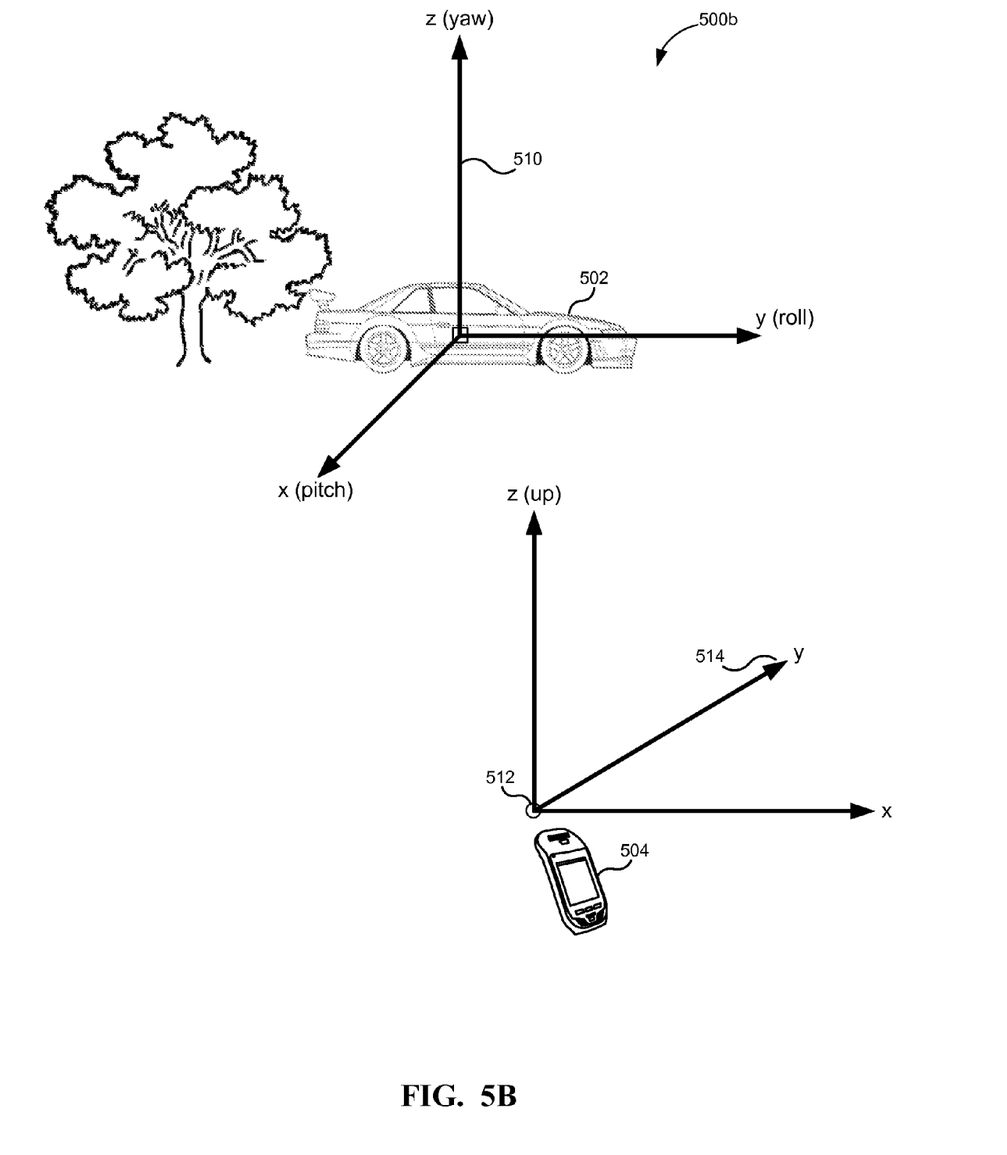

Similarly, FIG. 5B illustrates a simplified perspective view of a second measurement site 500b used in an exemplary method of determining a location of a target, according to one embodiment. Here, the target 502 still comprises the same car. The measuring device 504, however, is located at a second location 512. The GNSS subsystem of the measuring device 504 can determine second location coordinates of the measuring device 504 at the second location 512. Again, a number of coordinate systems may be involved in the second measurement. First, the real-world coordinate system can be the same as the real world coordinate system used in the first image of FIG. 5A. Second, a local coordinate system 514 for the measuring device 504 may have changed because of the change in location. Note the local coordinate system 514 is different from local coordinate system 508. Additionally, the target coordinate system 510 may be the same in both images.

Returning briefly to FIG. 4, the method may further include, at the first location, determining a gravitational direction (404). The gravitational direction may be determined using a gravitational measurement device, such as a 3-axis accelerometer. In one embodiment, the gravitational direction is represented using vector notation for the local coordinate system of the measurement device. For example, returning to FIG. 5A, the gravitational measurement may be expressed in terms of the local coordinate system 508 of the measuring device 504. The gravitational measurement may comprise a vector with x, y, and z components corresponding to the x, y, and z axes of the local coordinate system 508 of the measuring device 504. Alternatively, the gravitational measurement may comprise a polar coordinate with angles $\phi$, $\omega$, and $\kappa$ that define the orientation of the measuring device 504.

In one embodiment, the gravitational measurement may be used to define a camera tilt. The camera tilt may be comprised of a pitch angle and a roll angle. These two angles can be used to define a vector direction of the measuring device 504 in the local coordinate system 508 that can be rotated around the z-axis. The tilt of the camera comprising the pitch angle and the roll angle can be used as an input to a bundle adjustment.

As stated earlier, only a single gravitational measurement is needed to reduce the required number of images from three down to two. However, using only a single gravitational measurement may still require that at least five correspondence points can be identified in both images. By taking a second gravitational measurement at the second location, the minimum number of required images will still be two, but the required number of correspondence points may be reduced to four. Therefore, according to FIG. 4, the method may further include determining a second gravitational direction at the second location (414). Note that step 414 in FIG. 4 has a dashed border, signifying that this step is optional.

The method may also include capturing a first image using the camera at the first location (406). Additionally, the method may include capturing a second image using the camera at the second location (416). In one embodiment, the previously described operations may take place at approximately the same time that the images are captured at each location. In other words, at the first location, the first location coordinates may be determined at approximately the same time that the gravitational direction is determined and the image is captured. A similar sequence may be followed at the second location, but determining the second gravitational direction may be optional. Furthermore, each of these operations may take place in any order. In other words, the image may be captured first, followed by determining the location coordinates and the gravitational direction at each location.

The method may further include determining a plurality of correspondence points between the first image and the second image (408). In embodiments where only a single gravitational direction is determined, at least five correspondence points may be determined. In embodiments where at least two gravitational directions are determined, at least four correspondence points may be determined. The correspondence points may correspond to prominent features of a target. In one embodiment, an algorithm may be used to automatically determine and match features of the target between the first image and the second image. In another embodiment, a touchscreen of a measuring device may accept inputs from a user identifying correspondence points between the two images.

The method may also include determining a first plurality of image coordinates for the plurality of correspondence points in the first image (410). Additionally, the method may further include determining a second plurality of image coordinates for the plurality of correspondence points in the second image (420). In one embodiment, each image may be associated with two-dimensional image coordinates. Once correspondence points are identified between the two images, two-dimensional image coordinates can be obtained that identify the position of each correspondence point in each image.

Figure 6A:
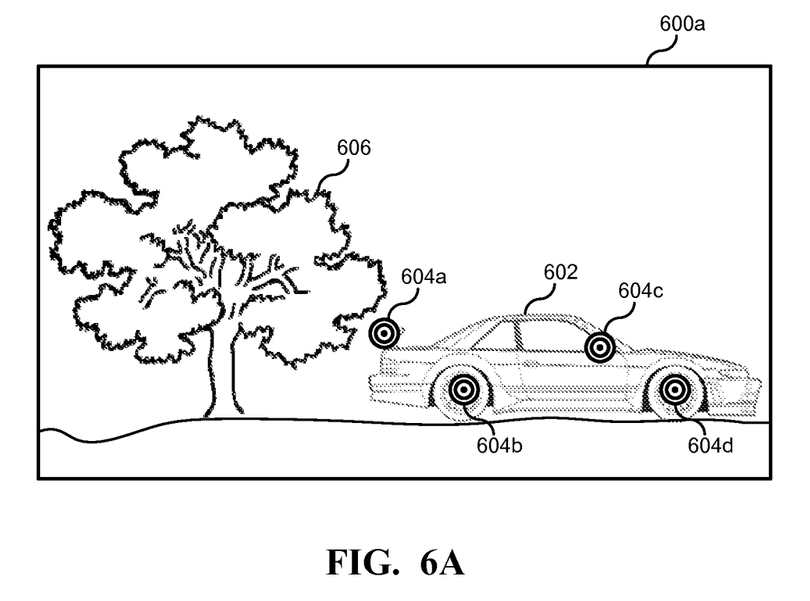
FIGS. 6A-6B illustrate simplified views of a first image and a second image captured at different locations, according to one embodiment.

FIG. 6A illustrates a simplified view of a first image 600a captured at a measurement site, such as the first measurement site 500a in FIG. 5A, according to one embodiment. In this example, the target 602 is a car. Note that other objects can appear in the image, such as the tree 606, that are not identified as the target. A plurality of correspondence points 604 may be identified as relating to features of the target 602. For example, correspondence point 604a is located at the fender of the car, correspondence point 604b is located at the rear tire of the car, correspondence point 604c is located at the side view mirror of the car, and correspondence point 604d is located at the front tire of the car.

In this example, only four correspondence points are required, indicating that a second gravitational direction is determined at the second location. In other embodiments, additional correspondence points may be used to reduce measurement error. Also in this example, each of the correspondence points is related to the target 602, i.e. the car. In some embodiments, the correspondence points may be required to be located on the target. In other embodiments, the correspondence points may be located anywhere in the scene such that they appear in each image.

Figure 6B:
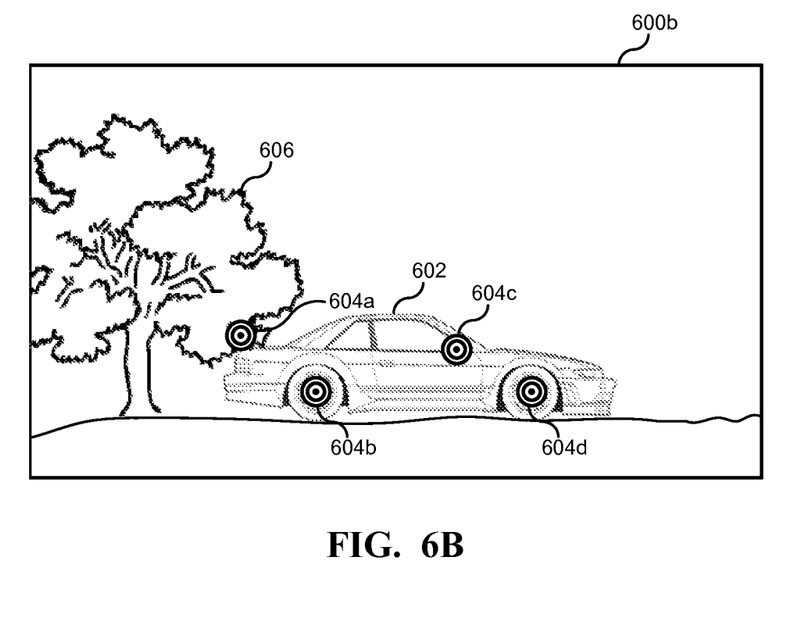

FIG. 6B illustrates a simplified view of a second image 600b captured at a measurement site, such as the second measurement 500b site in FIG. 5B, according to one embodiment. The second image 600b includes the same image elements as the first image 600a, including the target 602 (the car) and the tree 606. However, compared to the first image 600a, the elements in the second image 600b have shifted, indicating the change perspective between the first measurement site 500a and the second measurement site 500b. The plurality of correspondence points 604 are also identified in the second image 600b such that they correspond to the same image features identified in the first image 600a.

The plurality of correspondence points may be identified at any time after the images are captured. In one embodiment, the first image 600a can be analyzed immediately after it is captured, and the plurality of correspondence points corresponding to image features may be identified. Then, after the second image 600b is captured, it too can be analyzed to identify the same image features as correspondence points. Image coordinates in both the first image 600a and the second image 600b can then be determined. In another embodiment, the plurality of correspondence points is identified after both images have been captured. This may be advantageous where the change in perspective between the first location in the second location is large, resulting in very different perspectives of the image features.

Returning briefly to FIG. 4, the method may further include determining the location of the target using at least the first plurality of image coordinates, the second plurality of image coordinates, and the first gravitational direction (422). As used herein, the "target" can include any point on an object appearing in each of the images. Generally, the location of the target will be associated with at least one of the correspondence points. Therefore, when determining location of the target, the method will usually be determining the location of one of the correspondence points. For example, in image 600a of FIG. 6A, the target 602 is associated with the plurality of correspondence points 604. The location of the target 602 may be considered the location of any of the plurality of correspondence points 604, such as correspondence point 604c. In other embodiments, the location of the target may correspond to a weighted average location of the plurality of correspondence points 604. In one embodiment, a user may select one of the correspondence points may be selected to represent the location of the target 602.

Figure 7:
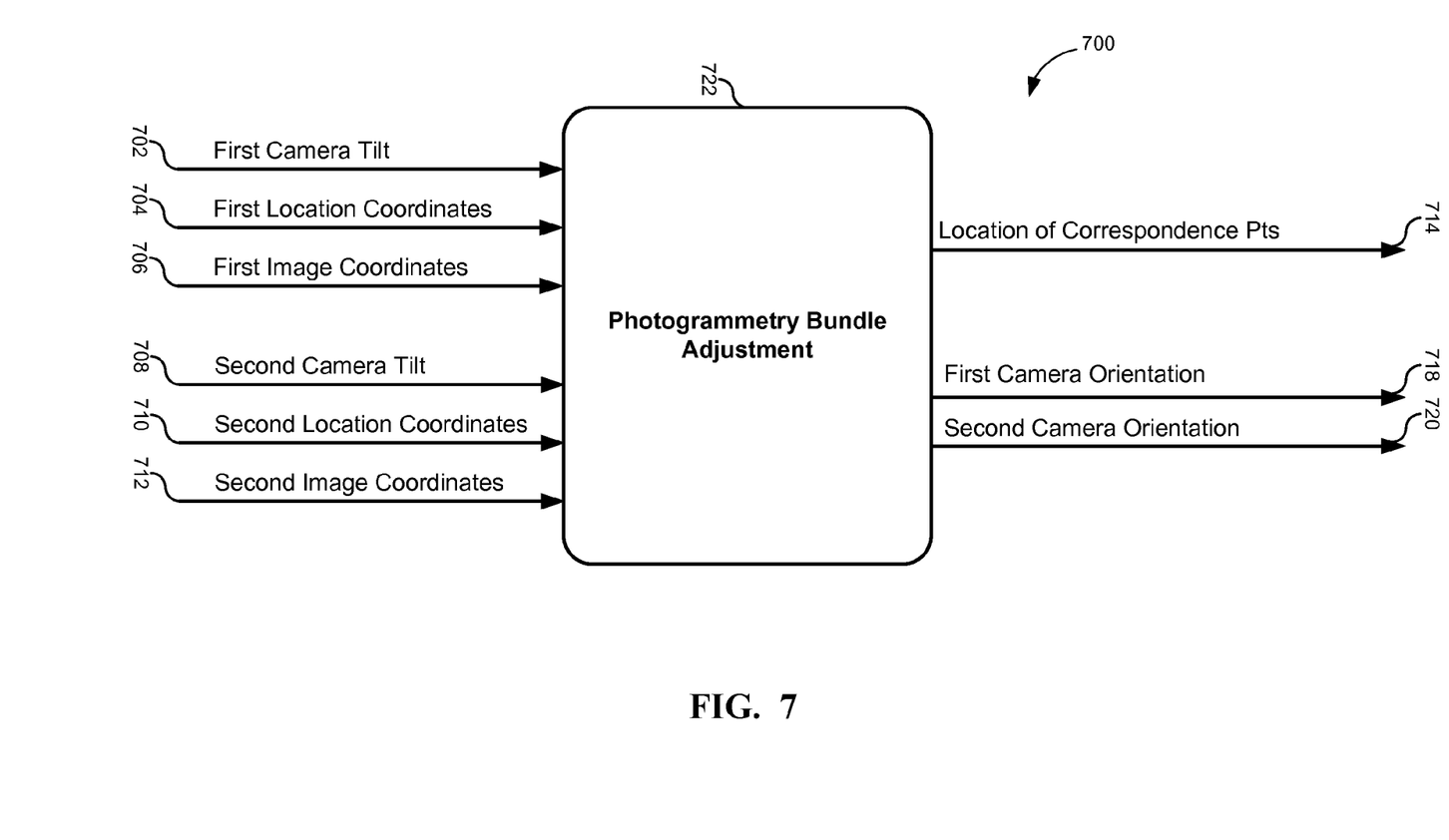
FIG. 7 illustrates a simplified block diagram of a bundle adjustment module, according to one embodiment.

In order to determine the location the target, a bundle adjustment may be used. Depending on the configuration of the bundle adjustment, different inputs in various forms may be required. FIG. 7 illustrates a simplified block diagram 700 of a bundle adjustment module, according to one embodiment. A photogrammetry bundle adjustment 722 is shown having various inputs and outputs. The inputs include a first camera tilt 702, first location coordinates 704, and first image coordinates 706. The inputs additionally include a second camera tilt 708, second location coordinates 710, and second image coordinates 712.

According to the configuration of the particular photogrammetry bundle adjustment 722, various inputs may be omitted or may otherwise have their format changed. For example, instead of requiring a first camera tilt 702 comprising a pitch angle and a roll angle, the photogrammetry bundle adjustment 722 may require a gravitational direction in [x, y, z] vector format. Additionally, the second camera tilt 708 may be omitted. In one embodiment, the first location coordinates 704 and the second location coordinates 710 may also be omitted, and the location of the target may be determined relative to the camera coordinate system.

The photogrammetry bundle adjustment 722 can provide outputs, such as the location of each of the correspondence points 714, a first camera orientation 718, and a second camera orientation 720. Any of these outputs may be omitted in order to streamline calculations within the photogrammetry bundle adjustment 722.

It should be appreciated that the specific steps illustrated in FIG. 4 provide a particular method of determining a location of a target using a measuring device according to embodiments of the present invention. Other sequences of steps may also be performed according to alternative embodiments. For example, alternative embodiments of the present invention may perform the steps outlined above in a different order. Moreover, the individual steps illustrated in FIG. 4 may include multiple sub-steps that may be performed in various sequences as appropriate to the individual step. Furthermore, additional steps may be added or removed depending on the particular applications. One of ordinary skill in the art would recognize many variations, modifications, and alternatives.

It should also be appreciated that each of the specific steps illustrated in FIG. 4 can be carried out by multiple separate devices. In one embodiment, the steps of receiving images, receiving location coordinates, and receiving a gravity measurement can be executed by a handheld device near the location of the target. The remaining steps, including determining the correspondence points, identifying image coordinates, and determining the location of the target can be carried out either on the handheld device, or alternatively, at a remote location on a separate computer system.

In one embodiment, a photogrammetric bundle adjustment typically solves for the camera location (X, Y, Z), orientation (ω, φ, κ), and the positions of the correspondence points. The gravity measurement can be used to calculate the device tilt or two of the three orientation parameters that are solved for in the bundle adjustment.

To compute the camera tilt from the gravity measurement, the calculations begin with the target coordinate frame 510 of FIG. 5A such that the y-axis points forward, the z-axis points up, and the x-axis completes a right handed coordinate system. The x-axis of the camera coordinate frame 508 in the target coordinate frame 510 can be formed by taking the cross-product of the gravity vector and the vector that defines the y axis target coordinate frame 510:

$$x_l^b = g^b \times y^b = \begin{bmatrix} g_x^b \\ g_y^b \\ g_z^b \end{bmatrix} \times \begin{bmatrix} 0 \\ 1 \\ 0 \end{bmatrix} = \begin{bmatrix} -g_z^b \\ 0 \\ g_x^b \end{bmatrix} \quad (1)$$

Normalizing equation (1) results in:

$$x_l^b = \begin{bmatrix} \frac{-g_z^b}{\sqrt{(g_x^b)^2 + (g_z^b)^2}} \\ 0 \\ \frac{g_x^b}{\sqrt{(g_x^b)^2 + (g_z^b)^2}} \end{bmatrix} \quad (2)$$

The y-axis of the camera coordinate frame 508 in the target coordinate frame 510 can be formed by taking the cross product of the gravity vector and the new x-axis:

$$y_l^b = g^b \times x_l^b = \begin{bmatrix} -g_z^b \\ 0 \\ g_x^b \end{bmatrix} \times \begin{bmatrix} g_x^b \\ g_y^b \\ g_z^b \end{bmatrix} = \begin{bmatrix} -g_x^b g_y^b \\ (g_z^b)^2 + (g_x^b)^2 \\ -g_y^b g_z^b \end{bmatrix} \quad (3)$$

Normalizing equation (3) results in:

$$y_l^b = \begin{bmatrix} \frac{-g_x^b g_y^b}{\sqrt{((g_x^b)^2 + (g_z^b)^2)((g_x^b)^2 + (g_y^b)^2 + (g_z^b)^2)}} \\ \frac{(g_z^b)^2 + (g_x^b)^2}{\sqrt{((g_x^b)^2 + (g_z^b)^2)((g_x^b)^2 + (g_y^b)^2 + (g_z^b)^2)}} \\ \frac{-g_y^b g_z^b}{\sqrt{((g_x^b)^2 + (g_z^b)^2)((g_x^b)^2 + (g_y^b)^2 + (g_z^b)^2)}} \end{bmatrix} \quad (4)$$

To complete the translation between the target coordinate axis 510 and the camera coordinate axis 508, the direction of the camera coordinate frame z-axis in the target coordinate frame is the gravity vector:

$$z_l^b = -g^b = \begin{bmatrix} -g_x^b \\ -g_y^b \\ -g_z^b \end{bmatrix} \quad (5)$$

Normalizing equation (5) results in:

$$z_l^b = \begin{bmatrix} \frac{-g_x^b}{\sqrt{(g_x^b)^2 + (g_y^b)^2 + (g_z^b)^2}} \\ \frac{-g_y^b}{\sqrt{(g_x^b)^2 + (g_y^b)^2 + (g_z^b)^2}} \\ \frac{-g_z^b}{\sqrt{(g_x^b)^2 + (g_y^b)^2 + (g_z^b)^2}} \end{bmatrix} \quad (6)$$

In order to rotate a vector from the camera coordinate frame 508 to the target coordinate frame 510, a rotation matrix must be found such that:

$$r^b = R_l^b r^l \quad (7)$$

Where $r^b$ is a vector in the target frame, $r^l$ is a vector in the camera frame, and $R_l^b$ is a rotation matrix from the camera coordinate frame 508 to target coordinate frame 510. Because the vectors for each of the three axes in both the camera coordinate frame 508 and the target coordinate frame 512 have already been obtained, a system of equations can be formed allowing a solution to be obtained for R:

$$x_l^b y_l^b z_l^b = R_l^b (x^l y^l z^l) \quad (8)$$

Expanding equation (8), with the results obtained in equations (2), (4), and (6), results in:

$$\begin{bmatrix} \dfrac{-g_z^b}{\sqrt{(g_x^b)^2+(g_z^b)^2}} & \dfrac{-g_x^b}{\sqrt{(g_x^b)^2+(g_y^b)^2+(g_z^b)^2}} & \dfrac{-g_x^b g_y^b}{\sqrt{((g_x^b)^2+(g_z^b)^2)((g_x^b)^2+(g_y^b)^2+(g_z^b)^2)}} \\ 0 & \dfrac{-g_y^b}{\sqrt{(g_x^b)^2+(g_y^b)^2+(g_z^b)^2}} & \dfrac{(g_z^b)^2+(g_x^b)^2}{\sqrt{((g_x^b)^2+(g_z^b)^2)((g_x^b)^2+(g_y^b)^2+(g_z^b)^2)}} \\ \dfrac{g_x^b}{\sqrt{(g_x^b)^2+(g_z^b)^2}} & \dfrac{-g_z^b}{\sqrt{(g_x^b)^2+(g_y^b)^2+(g_z^b)^2}} & \dfrac{-g_y^b g_z^b}{\sqrt{((g_x^b)^2+(g_z^b)^2)((g_x^b)^2+(g_y^b)^2+(g_z^b)^2)}} \end{bmatrix} = \quad (9)$$

$$R_l^b \begin{bmatrix} 1 & 0 & 0 \\ 0 & 1 & 0 \\ 0 & 0 & 1 \end{bmatrix}$$

Therefore, solving equation (9) for $R_l^b$ yields:

$$R_l^b = \begin{bmatrix} \dfrac{-g_z^b}{\sqrt{(g_x^b)^2+(g_z^b)^2}} & \dfrac{-g_x^b g_y^b}{\sqrt{((g_x^b)^2+(g_z^b)^2)((g_x^b)^2+(g_y^b)^2+(g_z^b)^2)}} & \dfrac{-g_x^b}{\sqrt{(g_x^b)^2+(g_y^b)^2+(g_z^b)^2}} \\ 0 & \dfrac{(g_z^b)^2+(g_x^b)^2}{\sqrt{((g_x^b)^2+(g_z^b)^2)((g_x^b)^2+(g_y^b)^2+(g_z^b)^2)}} & \dfrac{-g_y^b}{\sqrt{(g_x^b)^2+(g_y^b)^2+(g_z^b)^2}} \\ \dfrac{g_x^b}{\sqrt{(g_x^b)^2+(g_z^b)^2}} & \dfrac{-g_y^b g_z^b}{\sqrt{((g_x^b)^2+(g_z^b)^2)((g_x^b)^2+(g_y^b)^2+(g_z^b)^2)}} & \dfrac{-g_z^b}{\sqrt{(g_x^b)^2+(g_y^b)^2+(g_z^b)^2}} \end{bmatrix} \quad (10)$$

In photogrammetry, it is typical to define the rotation matrix such that:

$$R_l^b = R_z(\kappa) R_y(\phi) R_x(\omega) \quad (11)$$

Where:

$$R_x(\omega) = \begin{bmatrix} 1 & 0 & 0 \\ 0 & \cos\omega & \sin\omega \\ 0 & -\sin\omega & \cos\omega \end{bmatrix} \quad (12)$$

$$R_y(\varphi) = \begin{bmatrix} \cos\varphi & 0 & -\sin\varphi \\ 0 & 1 & 0 \\ \sin\varphi & 0 & \cos\varphi \end{bmatrix} \quad (13)$$

$$R_z(\kappa) = \begin{bmatrix} \cos\kappa & \sin\kappa & 0 \\ -\sin\kappa & \cos\kappa & 0 \\ 0 & 0 & 1 \end{bmatrix} \quad (14)$$

Inserting equations (12), (13), and (14) into equation (11) yields:

$$R_l^b = \quad (15)$$

$$\begin{bmatrix} \cos\kappa\cos\varphi & \sin\kappa\cos\omega+\cos\kappa\sin\varphi\sin\omega & \sin\kappa\sin\omega-\cos\kappa\sin\varphi\cos\omega \\ -\sin\kappa\cos\varphi & \cos\kappa\cos\omega-\sin\kappa\sin\varphi\sin\omega & \cos\kappa\sin\omega+\sin\kappa\sin\varphi\cos\omega \\ \sin\varphi & -\cos\varphi\sin\omega & \cos\varphi\cos\omega \end{bmatrix}$$

Equating the results of equation (10) with the results of equation (15) yields:

$$R_l^b = \begin{bmatrix} \dfrac{-g_z^b}{\sqrt{(g_x^b)^2+(g_z^b)^2}} & \dfrac{-g_x^b g_y^b}{\sqrt{((g_x^b)^2+(g_z^b)^2)((g_x^b)^2+(g_y^b)^2+(g_z^b)^2)}} & \dfrac{-g_x^b}{\sqrt{(g_x^b)^2+(g_y^b)^2+(g_z^b)^2}} \\ 0 & \dfrac{(g_z^b)^2+(g_x^b)^2}{\sqrt{((g_x^b)^2+(g_z^b)^2)((g_x^b)^2+(g_y^b)^2+(g_z^b)^2)}} & \dfrac{-g_y^b}{\sqrt{(g_x^b)^2+(g_y^b)^2+(g_z^b)^2}} \\ \dfrac{g_x^b}{\sqrt{(g_x^b)^2+(g_z^b)^2}} & \dfrac{-g_y^b g_z^b}{\sqrt{((g_x^b)^2+(g_z^b)^2)((g_x^b)^2+(g_y^b)^2+(g_z^b)^2)}} & \dfrac{-g_z^b}{\sqrt{(g_x^b)^2+(g_y^b)^2+(g_z^b)^2}} \end{bmatrix} = \quad (16)$$

$$\begin{bmatrix} \cos\kappa\cos\varphi & \sin\kappa\cos\omega+\cos\kappa\sin\varphi\sin\omega & \sin\kappa\sin\omega-\cos\kappa\sin\varphi\cos\omega \\ -\sin\kappa\cos\varphi & \cos\kappa\cos\omega-\sin\kappa\sin\varphi\sin\omega & \cos\kappa\sin\omega+\sin\kappa\sin\varphi\cos\omega \\ \sin\varphi & -\cos\varphi\sin\omega & \cos\varphi\cos\omega \end{bmatrix}$$

Solving equation (16) for the pitch and roll angles φ and ω yields:

$$\varphi = \sin^{-1}\left(\frac{-g_x}{\sqrt{g_x^2 + g_z^2}}\right) \quad (17)$$

$$\omega = \tan^{-1}\left(\frac{-g_y}{\sqrt{g_x^2 + g_z^2}}\right) \quad (18)$$

The advantage of this method is that a 3-axis accelerometer indirectly measures ω and φ, which can then be used as direct observations within the bundle adjustment. In other words, these equations make it relatively easy to include these two angles mathematically as inputs to the bundle adjustment. However, using these angles may create a problem in one particularly unlikely use case involving a traditional problem when using Euler angles. Generally, if the first rotation is 90 or 270 degrees, the second rotation may no longer be meaningful. This is particularly true with the gravity measurement, i.e., the camera is pointing straight up or straight down. Fortunately, if this case occurs, there is little value in the second measurement anyway, as all of the information really lies in the first rotation.

After a measuring device has determined at least one gravity measurement, obtained two sets of location coordinates, obtained two images, identified correspondence points, and derived image coordinates for the correspondence points, this information may be provided to an adjustment bundle for processing in accordance with known techniques.

It will be understood in light of this disclosure that the examples and embodiments described herein are for illustrative purposes only and that various modifications or changes in light thereof will be suggested to persons skilled in the art and are to be included within the spirit and purview of this application and scope of the appended claims.

What is claimed is:

1. A method for determining a location of a target in a real-world coordinate system using a measuring device comprising a camera, the method comprising:
    at a first location:
        determining first location coordinates of the measuring device, wherein the first location coordinates comprise real-world coordinates;
        determining a first gravitational direction; and
        capturing a first image using the camera;
    at a second location:
        determining second location coordinates of the measuring device, wherein the second location coordinates comprise real-world coordinates; and
        capturing a second image using the camera;
    determining a plurality of correspondence points between the first image and the second image;
    determining a first plurality of image coordinates for the plurality of correspondence points in the first image;
    determining a second plurality of image coordinates for the plurality of correspondence points in the second image;
    determining the location of the target in the real-world coordinate system by providing at least the first plurality of image coordinates, the second plurality of image coordinates, the first location coordinates, the second location coordinates, and the first gravitational direction to a bundle adjustment.

2. The method of claim 1 wherein the location of the target comprises a GNSS coordinate.

3. The method of claim 1 wherein determining the location of the target comprises:
    determining a first camera tilt comprising a first pitch angle and a first roll angle; and
    determining a second camera tilt comprising a second pitch angle and a second roll angle.

4. The method of claim 3 wherein determining the location of the target further comprises providing the first camera tilt, the second camera tilt, the first plurality of image coordinates, the second plurality of image coordinates, the first location coordinates, and the second location coordinates to a bundle adjustment.

5. The method of claim 3 wherein the first roll angle is determined by $$\tan^{-1}\frac{-g_y}{\sqrt{g_x^2 + g_z^2}},$$

wherein $g_x$ represents a component of the first gravitational direction in the x direction, $g_y$ represents a component of the first gravitational direction in the y direction, and $g_z$ represents a component of the first gravitational direction in the z direction.

6. The method of claim 3 wherein the first pitch angle is determined by $$\sin^{-1}\frac{-g_x}{\sqrt{g_x^2 + g_z^2}},$$

wherein $g_x$ represents a component of the first gravitational direction in the x direction, and $g_z$ represents a component of the first gravitational direction in the z direction.

7. The method of claim 3 further comprising propagating an error estimate from one or more of the determining steps to determine an error estimate for the location of the target.

8. The method of claim 1 further comprising determining an orientation of the camera at the first location.

9. The method of claim 1 wherein the location of the target comprises a location of one of the plurality of correspondence points.

10. The method of claim 1 wherein the camera is not accelerating when capturing the first image and the second image.

11. The method of claim 1 further comprising determining the plurality of correspondence points using an algorithm configured to identify correspondences in a plurality of images.

12. The method of claim 1 further comprising determining a second gravitational direction at the second location, wherein:
    the plurality of correspondence points comprises four or more correspondence points; and
    the determining the location of the target further uses at least the second gravitational direction.

13. A system for determining a location of a target, the system comprising:
- a GNSS module configured to receive one or more GNSS signals;
- a camera;
- a gravitational measurement device; and
- one or more processors configured to:
  - at a first location:
    - receive first location coordinates of the GNSS module from the GNSS module, wherein the first location coordinates comprise real-world coordinates;
    - receive a first gravitational direction from the gravitational measurement device; and
    - receive a first image from the camera; and
  - at a second location:
    - receive second location coordinates of the GNSS module from the GNSS module, wherein the second location coordinates comprise real-world coordinates; and
    - receive a second image from the camera;
  - determine a plurality of correspondence points between the first image and the second image;
  - determine a first plurality of image coordinates for the plurality of correspondence points in the first image;
  - determine a second plurality of image coordinates for the plurality of correspondence points in the second image; and
  - determine the location of the target in the real-world coordinate system by providing at least the first plurality of image coordinates, the second plurality of image coordinates, the first location coordinates, the second location coordinates, and the first gravitational direction to a bundle adjustment.

14. The system of claim 13 wherein the gravitational measurement device comprises a three-axis accelerometer.

15. The system of claim 13 further comprising a display screen.

16. The system of claim 15 wherein the one or more processors are further configured to receive, using the display screen, a selection of the plurality of correspondence points from a user.

17. The system of claim 15 wherein the display screen is configured to display the first image and the second image.

18. The system of claim 13 further comprising a hand-held enclosure that at least partially encloses the GNSS module, the gravitation measurement device, and the one or more processors.

19. The system of claim 13 the one or more processors are further configured to determine that the second plurality of image coordinates are not necessary, wherein a first roll angle of the camera at the first location is either approximately 90 degrees or 270 degrees.

20. The system of claim 13 wherein the one or more processors is further configured to operate as a bundle adjustment.

* * * * *